Patented Nov. 29, 1938

2,138,381

UNITED STATES PATENT OFFICE 2,138,381

COMPOUNDS OF THE ANTHRAPYRIDINE AND ANTHRAPYRIMIDINE SERIES

Karl Koeberle and Christian Steigerwald, Ludwigshafen-on-the-Rhine, Germany, assignors to General Aniline Works, Inc., New York, N. Y., a corporation of Delaware No Drawing. Application September 23, 1936, Serial No. 102,174. In Germany October 12, 1935

5 Claims. (Cl. 260—261)

The present invention relates to heterocyclic compounds.

We have found that valuable and new compounds of the heterocyclic series are obtained by causing reducing agents and ammonia, hydrazines, hydroxylamines or primary amines to act on compounds of the general composition:

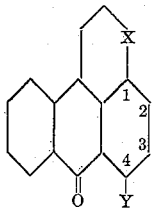

in which X is a ring member, situated in the 1-position, of a ring joined in the 1.9-position and represents N, NH, or N-alkyl, and Y is a hydroxyl group or an amino group, in which one hydrogen atom may be replaced by an alkyl, aralkyl, cycloalkyl or aryl group. If desired, the resulting compounds which contain in each of the 2- and 3-positions the hydrogen atom more than the initial material and may, therefore, be considered to be stable reduction products or leuco derivatives thereof, may be treated with oxidizing agents thus removing the said two hydrogen atoms in the 2- and 3-positions.

As initial materials which correspond to the said composition may be mentioned: 4-amino-1.9-anthrapyrimidine, 4-amino-Py.C - chlor - 1.9 - anthrapyrimidine, 4 - amino - Py.C - alkyl - 1.9 - anthrapyrimidines, 4 - amino - Py.C-aryl-1.9-anthrapyrimidines, 4-amino-Py.C-amino - 1.9 - anthrapyrimidine, 4-amino-Py.C - alkylamino - 1.9- anthrapyrimidines, 4-amino-Py.C-arylamino-1.9-anthrapyrimidines, 4-amino - Py.C - acylamino-anthrapyrimidines, 4-amino-2-halogen - 1.9 - anthrapyrimidines, 4-amino-2-alkoxy-1.9 - anthrapyrimidines, 4-amino-1.9 - anthrapyrimidine - 2 - sulphonic acids, which in turn may bear further atoms or atomic groups on the Py.C-atom, 4-acyl-amino-1.9-anthrapyrimidines (as for example 4 - acetylamino - 1.9-anthrapyrimidine, 4-benzoylamino - 1.9 - anthrapyrimidine, 4 - para - chlorbenzoylamino-Py.C-methyl - 1.9 - anthrapyrimidine, 4 -(2'.5'- dichlorbenzoylamino)- Py.C - phenyl-1.9-anthrapyrimidine, 4-paratoluyl-Py.C-anthraquinonyl - 1.9 - anthrapyrimidine and 4 - benzoyl-Py.C-benzoyl-amino-1.9 - anthrapyrimidine), 4-hydroxy-, 4-alkoxy or 4-acyloxy-1.9-anthrapyrimidines, which may also contain further atoms or groups on the Py.C-atom, 4-alkyl-amino-, 4-aralkyl-amino -, 4 - cycloalkylamino - and 4-arylamino-1.9-anthrapyrimidines and 4-amino-1.9-anthrapyrimidines which contain a heterocyclic radicle in the amino group and 4-hydrazino-, 4-phenylhydrazino- and 4-hydroxylamino-1.9-anthrapyrimidines. There may also be mentioned 4-amino-1.9-anthrapyrimidone, 4-amino - N - alkyl - 1.9 - anthrapyrimidone, 4-hydroxy-, 4-alkoxy- or 4-acyloxy-1.9-anthrapyrimidones, 4-hydroxy-, 4-alkoxy- or 4-acyloxy-N-alkyl-1.9-anthrapyrimidones, 4-acylamino-1.9- anthrapyrimidones, such as 4-benzoylamino-, 4-anthraquinonylamino - N - methyl -, 4 - acetyl-amino-, 4-alkylamino-, 4-aralkylamino-, 4-cycloalkylamino - and 4 - arylamino - 1.9 - anthrapy-rimidones. In addition to the 1.9-anthrapyridones corresponding to the anthrapyrimidones, there may also be mentioned the Py.C-acyl-1.9-anthrapyridones, as for example 4-amino-Py.C-acetyl-, 4-amino-Py.C-carbalkoxy- and 4-amino-Py.C - benzoyl - 1.9 - anthrapyridones and their derivatives which contain in the 4-amino group an alkyl, aralkyl, cycloalkyl, aryl, hydroxyl, amino, alkylamino, arylamino or acyl group or which are alkylated at the nitrogen of the pyridone ring. Furthermore there may be mentioned 4-amino-Bz.2-alkyl - Bz.1 - azabenzanthrones, 4-amino - Bz.2 - aryl - Bz.1 - azabenzanthrones, 4 - amino-Bz.2-halogen-Bz.1 - azabenzanthrones, 4 - amino-Bz.2-amino- (or -alkyl-, -aralkyl-, -cycloalkyl- or -arylamino - ) - Bz.1 - azabenzanthrones and 4-amino-Bz.2.Bz.3-tetrahydrobenzene - Bz.1-azabenzanthrones which may contain in the 4-amino group an alkyl, aralkyl, cycloalkyl, aryl, acyl, amino, hydroxyl, alkylamino or arylamino group or a heterocyclic radicle. The 4-hydroxy compounds may also be used instead of the 4-amino compounds. Finally there may also be used 4-amino- or 4-hydroxy compounds of the coeroxene, coerthiene and coeramidene series, and also 4-amino- or 4-hydroxythiopheno-anthrones, - pyrroleoanthrones, - pyrazoloan-thrones, - isoxazoloanthrones, - isothiazoloan-thrones or -isoselenazoloanthrones.

A great variety of reducing agents may be used for the reaction. Alkali hydrosulphites are especially suitable, preferably in the presence of mild alkali, zinc dust, stannous chloride or titanium trichloride. It is preferable to carry out the reaction with gentle heating and in the presence of a diluent. Suitable diluents are for example water, alcohols of low molecular weight (methanol, ethanol, butanols and cyclohexanol), liquid ketones, ethers, esters, hydrocarbons, halogenated hydrocarbons, pyridine, quinoline and dioxane.

As oxidizing agents for the treatment referred to above, there may be mentioned for example sodium chlorate, sodium perborate, hydrogen peroxide, iron chloride and aromatic nitro compounds. The oxidation may be effected especially simply by means of air, oxygen or oxides of nitrogen.

The compounds obtainable according to this invention are usually obtained in good yields and in a pure state. When necessary they may be purified by crystallization, boiling with solvents or by way of their salts with strong acids. The oxidized products are for the greater part valuable dyestuffs which are suitable for dyeing cellulose esters and ethers, hydrocarbons, fats, oils, waxes and artificial compositions of a great variety of kinds. In part they may also be used for dyeing vegetable and animal fibres. For example they will in part directly dye cotton or wool. Furthermore the sulphonic acids of the oxidized compounds are suitable for dyeing wool from acid baths. Finally they may also be used with advantage for the preparation of other dyestuffs.

The following examples will further illustrate how the said invention may be carried out in practice but the invention is not restricted to these examples. The parts are by weight.

*Example 1*

A mixture of 24.8 parts of 4-hydroxy-1.9-anthrapyrimidine, 35 parts of sodium hydrosulphite, 300 parts of methanol, 100 parts of water and 30 parts of a 25 per cent aqueous solution of ammonia is heated while stirring for about 5 hours at from 60° to 70° C. The mass is then allowed to cool and the yellow precipitate is filtered off by suction, washed with methanol and water and dried. The yellow powder thus obtained is insoluble in caustic soda solution and dissolves in concentrated sulphuric acid giving a yellow-brown coloration. According to analysis and its properties it is leuco-4-amino-1.9-anthrapyrimidine.

The corresponding leuco-4-amino-1.9-anthrapyrimidines are obtained in the same manner from 4-hydroxy-1.9-anthrapyrimidines which contain an alkyl, aralkyl, cycloalkyl, aryl, amino, alkylamino, arylamino or acylamino group or halogen on the Py.C-atom.

*Example 2*

A mixture of 247 parts of 4-amino-1.9-anthrapyrimidine, 350 parts of sodium hydrosulphite, 3000 parts of methanol, 1000 parts of water and 300 parts of a 25 per cent aqueous solution of ammonia is heated while stirring at from 60° to 70° C. until a sample withdrawn dissolves in concentrated sulphuric acid giving a brownish-yellow coloration; this is the case after about half an hour. The whole is then allowed to cool and the resulting leuco-4-amino-1.9-anthrapyrimidine is filtered off by suction, washed with methanol and water and dried. It is a pale yellow crystal powder which dissolves in concentrated sulphuric acid giving a brown-yellow coloration and which melts at about 300° C. with decomposition.

The same compound is obtained by starting from 2-brom-4-amino-1.9-anthrapyrimidine, 2-methoxy-4-amino-1.9-anthrapyrimidine or 2.3-dichlor-4-amino-1.9-anthrapyrimidine instead of from 4-amino-1.9-anthrapyrimidine.

The derivatives of 4-amino-1.9-anthrapyrimidine, as for example 4-amino-Py.C-alkyl-1.9-anthrapyrimidines, 4-amino-Py.C-aryl-1.9-anthrapyrimidines, 4-amino-Py.C-aralkyl- or -cycloalkyl-1.9-anthrapyrimidines, 4-amino-Py.C-amino-1.9-anthrapyrimidine and those which contain an alkyl, aralkyl, cycloalkyl or aryl group in the Py.C-amino group, behave in the same manner as 4-amino-1.9-anthrapyrimidine itself.

A mixture of 25 parts of the leuco-4-amino-1.9-anthrapyrimidine obtained according to the first paragraph of this example, 20 parts of normal propylamine and 200 parts of isobutyl alcohol is heated while stirring for six hours at from 60° to 70° C. 1 part of copper acetate and 6 parts of piperidine are then added and air is led through the boiling mixture until the oxidation is completed. The whole is then allowed to cool and the resulting crystals are filtered off by suction, washed with methanol and dried. The 4-normal-propylamino-1.9-anthrapyrimidine obtained dyes acetate artificial silk yellow shades.

If other alkylamines, as for example methylamine, ethylamine, normal butylamine, amylamines, hexylamines, dodecylamine, stearylamine, monohydroxyethyl-ethylene-diamine, ethylene diamine or monophenyl-ethylene-diamine, be used instead of normal propylamine, the corresponding 4-amino-1.9-anthrapyrimidines are obtained which may be used in part as dyestuffs for acetate artificial silk and in part for the coloring of solid and liquid hydrocarbons, oils and waxes.

*Example 3*

A mixture of 30 parts of the leuco-4-amino-1.9-anthrapyrimidine obtainable according to the first paragraph of Example 2, 17 parts of aniline hydrochloride and 200 parts of isobutyl alcohol is heated while stirring for 4 hours at the boiling point with access of air. After cooling, the deposited red-yellow needles are filtered off by suction, washed with methanol and water and dried. The leuco-4-anilido-1.9-anthrapyrimidine thus obtained dyes wool after oxidation in the sulphonated form red-yellow shades.

Corresponding compounds are obtained by employing, instead of aniline hydrochloride, the salts of other aromatic amines, as for example of the toluidines, anisidines, aminohydroxy-benzenes, phenylene-diamines, aminonaphthalenes, aminodiphenyls, aminocarbazoles, aminodiphenylene oxides, aminoquinolines or aminoisoquinolines.

*Example 4*

A mixture of 25 parts of the leuco-4-amino-1.9-anthrapyrimidine obtainable according to the first paragraph of Example 2, 10 parts of hydrazine hydrate and 300 parts of methanol is heated for 2 hours at the boiling point while stirring. The mixture is then allowed to cool and the resulting yellow needles are filtered off by suction, washed with methanol and dried. Leuco-4-hydrazino-1.9-anthrapyrimidine is thus formed.

If phenyl-hydrazine or naphthyl-hydrazine be employed instead of hydrazine hydrate, the corresponding leuco-4-phenyl-hydrazino- or leuco-4-naphthyl-hydrazino-1.9-anthrapyrimidine is obtained.

*Example 5*

A mixture of 25 parts of 4-amino-1.9-anthrapyrimidine, 20 parts of ethanolamine, 35 parts of sodium hydrosulphite, 300 parts of methanol and 100 parts of water is heated to boiling while stirring until initial material can no longer be detected. The whole is then allowed to cool and the deposited pale yellow crystals are filtered off by suction, washed with methanol and dried. The leuco-4-hydroxyethylamino-1.9-anthrapyrimidine thus obtained is suspended in ten times its amount of nitrobenzene and the mixture is heated for about an hour at 150° C. after the addition of a little piperidine. By cooling, 4-hydroxyethyl-amines-1.9-anthrapyrimidine is separated in the form of long brown-yellow crystals. It dyes acetate artificial silk yellow shades. Yellow dyeings are obtained on wool and reddish yellow dyeings on cotton mordanted with tannin.

By using 1.2-propanolamine or 1.3-propanolamine instead of ethanolamine, the corresponding 4-amino-1.9-anthrapyrimidines are obtained.

Example 6

A mixture of 25 parts of 4-hydroxy-1.9-anthrapyrimidine, 30 parts of benzylamine, 35 parts of sodium hydrosulphite, 300 parts of methanol and 100 parts of water is heated for 5 hours at from 60° to 70° C. while stirring. After cooling, the resulting compound is filtered off by suction, washed with methanol and dried. Leuco-4-benzylamino-1.9-anthrapyrimidine is thus obtained in the calculated yield in the form of a pale yellow crystal powder which may be oxidized, for example in the manner described in Example 5, to 4-benzylamino-1.9-anthrapyrimidine.

Instead of benzylamine, other aralkylamines, as for example beta-phenylethylamine or omega-aminomethylnaphthalene, may be employed. The corresponding leuco-4-amino-1.9-anthrapyrimidines are thus obtained.

Example 7

A mixture of 13 parts of 4-hydroxy-Bz.2-methyl-Bz.1-aza-benzanthrone, 10 parts of ethanolamine, 13 parts of sodium hydrosulphite, 100 parts of methanol and 30 parts of water is heated to boiling for 5 hours while stirring. After cooling, the resulting pale yellow crystals are filtered off by suction, washed with water and dried. The leuco - 4 - hydroxyethylamino-Bz.2 - methyl-Bz.1-azabenzanthrone thus obtained dissolves in concentrated sulphuric acid to give an almost colorless solution without fluorescence. The leuco compound may be oxidized to 4-hydroxy-ethylamino-Bz.2-methyl-Bz.1 - azabenzanthrone with the aid of nitrobenzene. It forms yellow needles and dyes acetate artificial silk yellow shades.

The same compound is obtained by starting from 4 - amino-Bz.2 - methyl - Bz.1 - azabenzanthrone. The corresponding compounds are also obtained by employing other hydroxyalkylamines, alkylamines, aralkylamines or cycloalkylamines instead of ethanolamine.

Example 8

A mixture of 14.4 parts of 4-amino-N-methyl-1.9-anthrapyrimidone, 10 parts of ethanolamine, 17 parts of sodium hydrosulphite, 150 parts of methanol and 50 parts of water is heated to boiling for 5 hours while stirring. After cooling, the resulting brown crystals are filtered off by suction and washed with water. They dissolve in concentrated sulphuric acid giving a yellow-brown coloration without fluorescence; the color changes to red upon the addition of formaldehyde. When viewed from the top, the liquid is green. By drying this leuco compound it oxidizes in the air to 4-hydroxyethylamino-N-methyl-1.9-anthrapyrimidone which dissolves in concentrated sulphuric acid giving a powerful red-yellow coloration and a strong yellow fluorescence. By adding formaldehyde, this color is changed to red. When viewed from the top, the liquid is blue.

Instead of 4-amino-N-methyl-1.9-anthrapyrimidone, 4 - hydroxy-N-methyl - 1.9 - anthrapyrimidone may be employed. Similarly the ethanolamine may be replaced by other hydroxyalkylamines or alkylamines, aralkylamines, cycloalkylamines or arylamines.

4-amino- or 4-hydroxy-1.9-anthrapyrimidone itself or the 4-amino- or 4-hydroxy-1.9-anthrapyridones, 4-amino- and 4-hydroxy-N-methylanthrapyridones, 4-amino- and 4-hydroxy-Py.C-acyl-1.9-anthrapyridones and 4-amino- and 4-hydroxy-Py.C - acyl - N - methyl-1.9-anthrapyridones may be employed equally well for the reaction.

Example 9

A mixture of 14.4 parts of 4-amino-N-methyl-1.9-anthrapyrimidone, 17 parts of sodium hydrosulphite, 150 parts of methanol, 50 parts of water and 15 parts of a 25 per cent aqueous solution of ammonia is heated for 5 hours while stirring at from 60° to 70° C. After cooling, the crystals formed are filtered off by suction, washed with water and methanol and dried. The leuco-4-amino-N-methyl-1.9-anthrapyrimidone thus obtained dissolves in concentrated sulphuric acid giving a yellow coloration without fluorescence; by the addition of formaldehyde the color is changed to red. When viewed from the top, the solution is green.

A mixture of 14.4 parts of this leuco compound, 10 parts of normal butylamine and 150 parts of methanol is heated for about six hours at from 60° to 70° C. while stirring. After cooling, the resulting leuco compound is filtered off by suction, washed with methanol and dried. When dried in the air it is converted slowly into the red 4-normal, butylamino-1.9-anthrapyrimidone.

Other alkylamines and also aralkylamines, cycloalkylamines and arylamines may be employed in the same way. The reaction proceeds especially well with the arylamines if they are employed in the form of their salts with strong acids.

Example 11

Into a mixture of 24.7 parts of 4-hydroxy-1.9-anthrapyrimidine, 100 parts of glacial acetic acid and 100 parts of concentrated hydrochloric acid there are introduced while stirring at from 60° to 70° C. 20 parts of tin in small batches, the mixture then being stirred at from 70° to 80° C. until the tin has completely dissolved. The whole is allowed to cool, filtered by suction, washed with concentrated hydrochloric acid and the residue is suspended in water and rendered just neutral with ammonia. In this manner the brownish hydrochloride first obtained is converted into the free, yellow colored leuco-4-hydroxy-1.9-anthrapyrimidine. It is filtered off by suction, washed with water and ethanol and dried. It dissolves in caustic soda solution and in concentrated sulphuric acid giving a yellow coloration.

4-hydroxy - 1.9 - anthrapyrimidines containing atoms or atomic groups on the Py.C-atom may likewise be converted into their leuco compounds.

A mixture of 25 parts of the leuco compound obtainable according to the first paragraph of this example, 20 parts of a 25 per cent aqueous solution of methylamine and 150 parts of methanol is heated at from 60° to 70° C. for about 5 hours while stirring. After adding 0.5 part of copper acetate and 3 parts of piperidine, air is led through the boiling mixture until leuco compound is no longer present. The mixture is then allowed to cool and the deposited yellow needles are filtered off by suction, washed with methanol and dried. The 4-methylamino-1.9-anthrapyrimidine thus obtained dyes acetate artificial silk yellow shades.

If other alkylamines, aralkylamines or cycloalkylamines be employed instead of methylamine, the corresponding 4-amino-1.9-anthrapyrimidines are obtained.

What we claim is:

1. A heterocyclic compound corresponding to the general formula

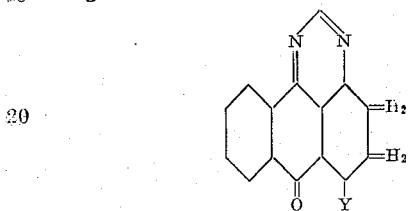

in which Y stands for a substituent selected from the class consisting of the hydroxyl, amino, alkylamino, aralkylamino, cycloalkylamino, and arylamino groups.

2. A heterocyclic compound corresponding to the general formula

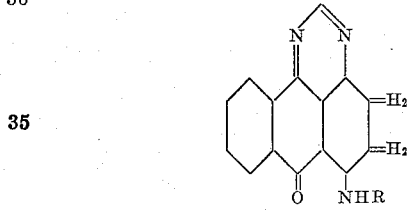

in which R stands for a member selected from the group consisting of hydrogen and alkyl.

3. The heterocyclic compound having the formula

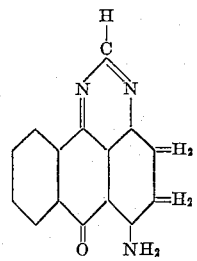

4. The heterocyclic compound having the formula

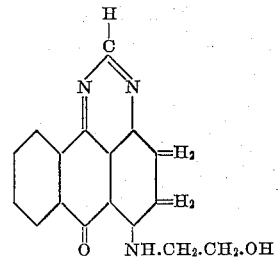

5. The heterocyclic compound having the formula

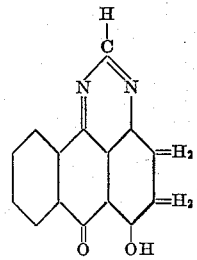

KARL KOEBERLE.
CHRISTIAN STEIGERWALD.